United States Patent
Gravelle et al.

(10) Patent No.: US 9,937,473 B2
(45) Date of Patent: *Apr. 10, 2018

(54) THIXOTROPIC ANHYDROUS SHEAR THINNING PEROXIDE DISPERSIONS

(71) Applicant: Arkema Inc., King of Prussia, PA (US)

(72) Inventors: Joseph M. Gravelle, Spring City, PA (US); Thomas H. Kozel, Pottstown, PA (US)

(73) Assignee: Arkema Inc., King of Prussia, PA (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/944,257

(22) Filed: Nov. 18, 2015

(65) Prior Publication Data

US 2016/0136601 A1    May 19, 2016

Related U.S. Application Data

(63) Continuation of application No. 13/147,457, filed as application No. PCT/US2010/022959 on Feb. 3, 2010, now Pat. No. 9,217,044.

(60) Provisional application No. 61/149,445, filed on Feb. 3, 2009.

(51) Int. Cl.
| | | |
|---|---|---|
| A62D 3/00 | (2006.01) |
| B01F 17/00 | (2006.01) |
| C08F 4/34 | (2006.01) |
| C08K 5/14 | (2006.01) |

(52) U.S. Cl.
CPC ............ B01F 17/0007 (2013.01); C08F 4/34 (2013.01); C08K 5/14 (2013.01)

(58) Field of Classification Search
CPC .................................... C08K 5/14; C08K 5/34
USPC ...... 252/186.26; 424/401; 502/160; 526/202
See application file for complete search history.

(56) References Cited

U.S. PATENT DOCUMENTS

| | | |
|---|---|---|
| 2,558,396 A | 6/1951 | Thomas |
| 3,507,800 A | 4/1970 | Leveskis |
| 3,795,630 A | 3/1974 | Jasper et al. |
| 3,825,509 A | 7/1974 | Miller |
| 4,039,475 A | 8/1977 | Oosterwijk et al. |
| 4,092,470 A | 5/1978 | Oosterwijk et al. |
| 4,387,044 A | 6/1983 | Sanchez et al. |
| 4,440,885 A | 4/1984 | Tamosauskas |
| 4,552,682 A | 11/1985 | Black et al. |
| 4,734,135 A | 3/1988 | Satomi et al. |
| 4,842,765 A | 6/1989 | Stomi |
| 5,300,600 A | 4/1994 | Bock et al. |
| 5,632,996 A | 5/1997 | Ramirez et al. |
| 5,690,856 A | 11/1997 | Milleville et al. |
| 5,914,301 A | 6/1999 | Hsu et al. |
| 6,482,786 B1 | 11/2002 | Del Duca et al. |
| 2001/0044497 A1 | 11/2001 | Myers |
| 2003/0050201 A1 | 3/2003 | Guillou et al. |
| 2004/0260111 A1 | 12/2004 | Van De Bovenkamp-Bouwman et al. |
| 2005/0281758 A1 | 12/2005 | Dodd et al. |
| 2006/0161121 A1 | 7/2006 | Klaveness et al. |
| 2006/0204530 A1 | 9/2006 | Ramirez et al. |
| 2011/0086959 A1 | 4/2011 | Kozel et al. |

FOREIGN PATENT DOCUMENTS

| | | |
|---|---|---|
| WO | WO 2007/005471 A2 | 1/2007 |
| WO | WO 2010/091035 A1 | 8/2010 |

*Primary Examiner* — Khanh Tuan Nguyen
(74) *Attorney, Agent, or Firm* — Lynn B. Morreale

(57) ABSTRACT

Provided are dispersions which comprise more than about up to 55 percent by weight or more of an organic peroxide which is normally solid in an anhydrous liquid phase such as dibutyl maleate or dioctyl adipate, with about 5% by weight or more fumed silica to provide a thixotropic, storage stable organic peroxide paste. Addition of about 5 weight % or more of fumed silica was found to result in the formation of a shear thinning anhydrous dispersion of organic peroxide which was storage stable.

20 Claims, No Drawings

THIXOTROPIC ANHYDROUS SHEAR THINNING PEROXIDE DISPERSIONS

CROSS-REFERENCE TO RELATED APPLICATIONS

This application is a continuation of U.S. application Ser. No. 13/147,457, filed Aug. 2, 2011, which is a national stage application under 35 U.S.C. § 371 of PCT/US2010/022959, filed Feb. 3, 2010, which claims benefit to U.S. Provisional Application No. 61/149,445, filed on Feb. 3, 2009, all of which are hereby incorporated by reference.

FIELD OF INVENTION

The present invention relates to anhydrous pastes of organic peroxides. The pastes are phthalate free and exhibit thixotropic properties. That is, the pastes are shear thinning so as to be pumpable/pourable when mixed or stirred which makes their handling and use easier.

BACKGROUND

Peroxides have, as a general property, a tendency to be flammable and explosive with some peroxides exhibiting such properties to a greater extent than others. For example, benzoyl peroxide may decompose when dry due to shock, friction, or static electricity. This property carries with it the obvious hazards to the users of these materials as well as to the manufacturers and intermediate handlers thereof. One particularly burdensome aspect of this property occurs during shipment of the peroxides. Accordingly, it has long been an object to provide flame resistant organic peroxide compositions. For example, U.S. Pat. No. 3,507,800 is directed to providing a flame resistant peroxide composition consisting essentially of three components—water, peroxide and solvent wherein the water is at least about 18 percent of the composition.

The safety and end-use advantage provided by water-soluble or water-emulsifiable peroxides is recognized. U.S. Pat. No. 3,825,509 describes a process for the suspension polymerization of vinyl chloride wherein the initiator is an aqueous emulsion of an organic peroxide in which the peroxide is present in an amount up to 19 weight percent. The surfactant used to prepare the aqueous peroxide emulsion is a combination of polyvinyl alcohol and polyoxyethylene sorbitan monolaurate. However, emulsions containing greater than about 19 percent by weight of organic peroxide are described as being too viscous and therefore difficult to handle.

There have been attempts in the past to make peroxide dispersions. U.S. Pat. Nos. 4,039,475 and 4,092,470 disclose stable, pumpable aqueous suspensions of organic peroxides using a mixture of a) nonionic emulsifiers having a maximum HLB value of 12.5 and b) nonionic emulsifiers having a minimum HLB value of 12.5 or anionic emulsifiers. U.S. Pat. No. 4,734,135 discloses aqueous suspensions of solid organic peroxides using a protective colloid, a surface active agent and water. U.S. Pat. No. 4,440,885 teaches emulsions of a solid organic peroxide using an emulsifier having an HLB value from about 9 to about 20, a hydrocarbon solvent and water.

Organic peroxides are used as initiators in polymerization operations such as for acrylic and polyester polymerizations. The organic peroxides such as benzoyl peroxide are commercially available as solutions/dispersions in phthalates such as dimethyl phthalate and dibutyl phthalate. Due to a perception of toxicity issues with phthalates, there is a current effort to discontinue their use in the production of polymers for certain uses.

SUMMARY OF THE INVENTION

The present invention is direct toward an anhydrous, phthalate free, peroxide paste which exhibits thixotropic properties. The anhydrous, phthalate free, peroxide paste of the present invention allows for the transportation and handling of a peroxide paste having a high concentration of peroxide which paste is shear thinning so it can be easily pumped/poured and is also is resistant to separation upon standing. The anhydrous, phthalate free, peroxide paste of the present invention is a paste of organic peroxide and fumed silica in a liquid phase. The liquid phase could be based upon diesters made from diacids such as C2-C10, saturated or unsaturated, and alcohols ranging from C1 to C10. It was discovered that the addition of anhydrous fumed silica to an anhydrous benzoyl peroxide in dibutyl maleate or dioctyl adipate pastes resulted in an anhydrous paste which was shear thinning, i.e. thixotropic.

DESCRIPTION OF PREFERRED EMBODIMENTS

The anhydrous pastes of the present invention comprises an organic peroxide, which is normally solid, in a phthalate free, liquid phase such as dibutyl maleate or dioctyl adipate the mixture also includes anhydrous fumed silica. By phthalate free, within the scope of the present invention, is meant substantially free of phthalates and that phthalates are not intentional add to the paste. It is intended that phthalate free herein include pastes which contain trace amounts of phthalates.

Exemplary of suitable organic peroxides are aromatic diacyl peroxides, such as benzoyl peroxide, o-methylbenzoyl peroxide, o-methoxybenzoyl peroxide, o-ethoxy benzoyl peroxide, o-chlorobenzoyl peroxide and 2,4-dichlorobenzoyl peroxide; aliphatic diacyl peroxides, such as decanoyl peroxide, lauroyl peroxide and myristoyl peroxide; ketone peroxides, such as 1-hydroxy cyclohexyl peroxide and 1-hydroperoxycyclohexyl peroxide; aldehyde peroxides such as 1-hydroxy heptyl peroxide; peroxy dicarbonates such as dicetyl peroxydicarbonate, di(4-t-butylcyclohexyl) peroxydicarbonate and acylperoxy alkylcarbonates, such as acetyl peroxy stearyl carbonate and the like.

The pastes of the present invention comprise about 40 percent or more by weight of organic peroxide. One of the features of the present invention is that it enables the preparation of pastes containing about 40 or more percent by weight of organic peroxide which pastes are pumpable because they are shear thinning. Heretofore it has been difficult to make pumpable pastes containing about 40 or more percent by weight organic peroxide. In this description, shear thinning means that viscosity drops as the shear rate increases. Thus, the viscosity of the peroxide pastes of the present invention will drop as the paste is stirred or mixed and it becomes pourable or pumpable easing use.

The organic peroxide is formed into a paste in a liquid phase such as a solvent/plasticizer such as dibutyl maleate or dimethyl maleate. Preferably the paste comprises about 40% and more preferably, 55% by weigh benzoyl peroxide in dibutyl maleate or dioctyl adipate. The organic peroxide paste is mixed with fumed silica in amounts greater than about 5% by weight to provide a thixotropic paste. It was found that when less than 5% of fumed silica was added to a 55 wt % benzoyl peroxide in dibutyl maleate or dioctyl adipate paste, phase separation occurred after a few days. However, when about 5% by weight of fumed silica was added, an extremely viscous paste form which did not separate over time and exhibited thixotropic properties.

The anhydrous, phthalate free peroxide paste of the present invention is formed by simple mixing of the organic peroxide with the liquid phase followed by addition of the fumed silica. The fumed silica is a very light fluffy power which is preferably added in multiple steps, typically three steps, in order to facilitate dispersion of the fumed silica throughout the organic peroxide paste. Upon addition of the full amount of fumed silica to the organic peroxide paste, the paste is poured into a suitable shipping container where it will thicken. The thickened paste can be easily removed from the container for use by mixing or stirring whereupon it becomes pourable.

The advantageous properties of this invention can be observed by reference to the following examples, which illustrate but do not limit the invention.

EXAMPLES

Example 1

A sample of paste in accordance with the present invention was prepared by combining anhydrous benzoyl peroxide and dibutyl maleate in a high shear mixer. After the peroxide was thoroughly dispersed, fumed silica (AEROSIL® 972 available from Evonik) was slowly added (typically in three portions). The final paste was then mixed in a high shear blender for 30 to 60 seconds. The sample was the placed in a 25° C. oven overnight. The following morning, the sample was removed from the oven and stirred vigorously. The viscosity was measured over the following three hours.

Paste Composition:

| Dibutyl Maleate | 45% by weight |
|---|---|
| Benzoyl Peroxide | 50% by weight |
| AEROSIL® 972 | 5% by weight |

Apparatus: Brookfield Model DV-II+ Viscometer
Spindle: T-C @2 rpm (helipath used)
Temperature: 25° C.
Viscosity:

| Time (Minutes) | Viscosity (cP) |
|---|---|
| 0 | 4,500 |
| 5 | 55,000 |
| 10 | 81,500 |
| 30 | 124,500 |
| 60 | 156,000 |
| 120 | 212,000 |
| 180 | 227,000 |

Example 2

A sample of paste in accordance with the present invention was prepared by combining anhydrous benzoyl peroxide and dioctyl adipate in a high shear mixer. After the peroxide was thoroughly dispersed, fumed silica (AEROSIL® 972 available from Evonik) was slowly added (typically in three portions). The final paste was then mixed in a high shear blender for 30-60 seconds. The viscosity was measured over a two-hour period at 22.5° C. (Room Temperature).

Paste Composition:

| Dioctyl Adipate | 45% by weight |
|---|---|
| Benzoyl Peroxide | 50% by weight |
| AEROSIL® 972 | 5% by weight |

Apparatus: Brookfield Model DV-II+ Viscometer
Spindle: T-C@2 rpm (helipath used)
Temperature: 22.5° C.
Experimental Results:

| Time Minutes | Viscosity (cP) |
|---|---|
| 0 | 2,500 |
| 5 | 20,000 |
| 10 | 31,000 |
| 30 | 44,500 |
| 60 | 56,000 |
| 120 | 67,000 |

The data in examples 1 and 2 shows that the viscosity of the mixture increased significantly with time after the string is stopped, i.e. the mixture was thixotropic. No phase separation was observed over time in either example.

Having described the invention, we now claim the following and their equivalents.

What is claimed is:

1. An anhydrous shear thinning dispersion which is phthalate free and thixotropic, comprising about 40% by weight or more of organic peroxide in an anhydrous liquid phase and about 5% by weight or more of anhydrous fumed silica based on total weight of the dispersion, wherein said anhydrous liquid phase comprises about 40% or more of diesters derived from saturated and/or unsaturated C2-C10 diacids.

2. The anhydrous dispersion of claim 1, wherein said organic peroxide is selected from the group consisting of diacyl peroxides, aliphatic diacyl peroxides, ketone peroxides, aldehyde peroxides, peroxy dicarbonates, acylperoxy alkylcarbonates and mixtures thereof.

3. The anhydrous dispersion of claim 2, wherein said diacyl peroxides are selected from the group consisting of benzoyl peroxide, o-methylbenzoyl peroxide, o-methoxybenzoyl peroxide, o-ethoxy benzoyl peroxide, o-chlorobenzoyl peroxide, 2,4-dichlorobenzoyl peroxide and mixtures thereof.

4. The anhydrous dispersion of claim 2, wherein said aliphatic diacyl peroxides are selected from the group consisting of decanoyl peroxide, lauroyl peroxide, myristoyl peroxide and mixtures thereof.

5. The anhydrous dispersion of claim 2, wherein said ketone peroxides are selected from the group consisting of 1-hydroxy cyclohexyl peroxide, 1-hydroperoxycyclohexyl peroxide and mixtures thereof.

6. The anhydrous dispersion of claim 2, wherein said aldehyde peroxides is 1-hydroxy heptyl peroxide.

7. The anhydrous dispersion of claim 2, wherein said peroxy dicarbonates are selected from the group consisting of dicetyl peroxydicarbonate, di(4-t-butylcyclohexyl) peroxydicarbonate and mixtures thereof.

8. The anhydrous dispersion of claim 2, wherein said acylperoxy alkylcarbonate is acetyl peroxy stearyl carbonate.

9. The anhydrous dispersion of claim of claim 1, wherein said diesters made from diacids are selected from the group consisting of dimethyl maleate, dibutyl maleate and dioctyl adipate.

10. The anhydrous dispersion of claim 1, wherein said anhydrous dispersion comprises about 55% by weight or more of said organic peroxide.

11. A process of imparting thixotropic properties to a phthalate free, thixotropic, anhydrous organic peroxide paste resistant to separation upon standing and comprising 40% by weight or more of organic peroxide, said process comprising mixing, with said paste 5% by weight or more of anhydrous fumed silica, wherein said anhydrous paste comprises a liquid phase comprising about 40% or more diester derived from saturated and/or unsaturated C2 to C10 diacids.

12. The process of claim 11, wherein said organic peroxide is selected from the group consisting of diacyl peroxides, aliphatic diacyl peroxides, ketone peroxides, aldehyde peroxides, peroxy dicarbonates, acylperoxy alkylcarbonates and mixtures thereof.

13. The process of claim 12, wherein said diacyl peroxides are selected from the group consisting of benzoyl peroxide, o-methylbenzoyl peroxide, o-methoxybenzoyl peroxide, o-ethoxy benzoyl peroxide, o-chlorobenzoyl peroxide, 2,4-dichlorobenzoyl peroxide and mixtures thereof.

14. The process of claim 12, wherein said aliphatic diacyl peroxides are selected from the group consisting of decanoyl peroxide, lauroyl peroxide, myristoyl peroxide and mixtures thereof.

15. The process of claim 12, wherein said ketone peroxides are selected from the group consisting of 1-hydroxy cyclohexyl peroxide, 1-hydroperoxycyclohexyl peroxide and mixtures thereof.

16. The process of claim 12, wherein said aldehyde peroxides is 1-hydroxy heptyl peroxide.

17. The process of claim 12, wherein said peroxy dicarbonates are selected from the group consisting of dicetyl peroxydicarbonate, di(4-t-butylcyclohexyl) peroxydicarbonate and mixtures thereof.

18. The process of claim 12, wherein said acylperoxy alkylearbonate is acetyl peroxy stearyl carbonate.

19. The process of claim 11, wherein said diester derived from diacids are selected from the group consisting of dimethyl maleate, dibutyl maleate and dioctyl adipate.

20. The process of claim 11, wherein said anhydrous dispersion comprises about 55% by weight or more of said organic peroxide.

* * * * *